Dec. 27, 1927.
A. E. WOLTER
1,654,474
BREATHER PIPE CAP
Filed Dec. 26, 1922
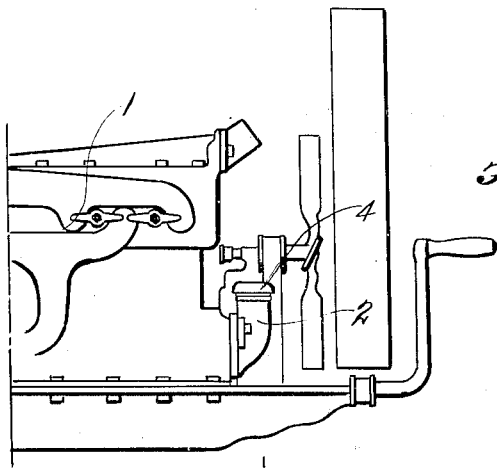
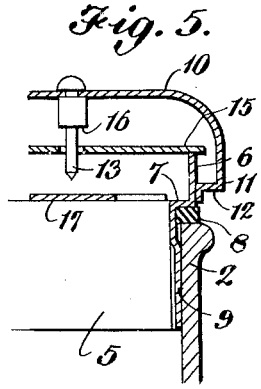
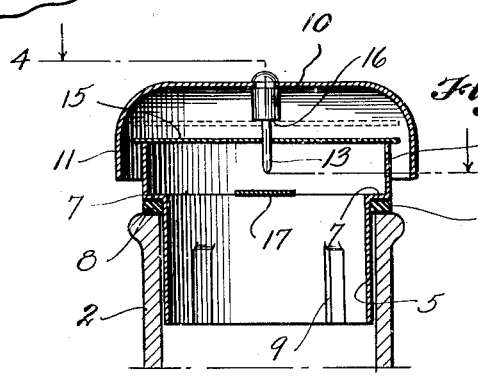
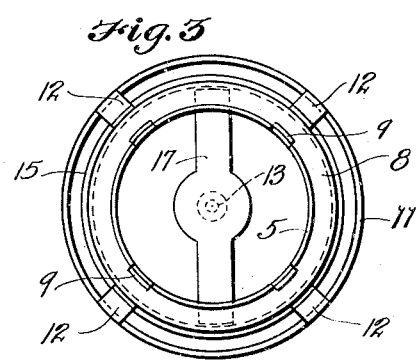
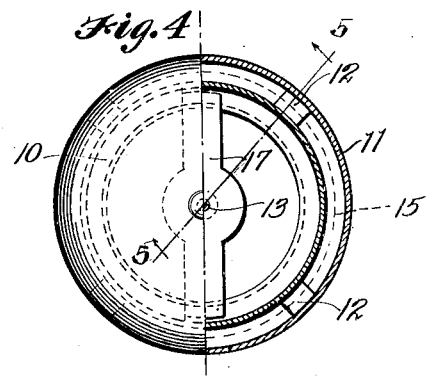
Inventor
ANTONE E. WOLTER
By Attorney
Richard J. Cook Patented Dec. 27, 1927.

1,654,474

UNITED STATES PATENT OFFICE.

ANTONE E. WOLTER, OF EVERETT, WASHINGTON, ASSIGNOR TO R. C. HEADLEY, OF LYNWOOD, CALIFORNIA.

BREATHER-PIPE CAP.

Application filed December 26, 1922. Serial No. 608,953.

This invention relates to improvements in caps for breather pipes of automobiles, and more particularly to improvements in caps of that type adapted to cover the breather pipe of a Ford automobile engine through which oil is poured into the crank case.

It is the principal object of the invention to provide a cap for covering the pipe and which is equipped with a valve which operates automatically to permit an easy exhaustion of air from the crank case incidental to operation of the engine but which prevents any rapid intaking of air, and in this way eliminates pumping of oil by the pistons into the cylinders, keeps dirt and moisture from the oil and adds to the efficiency of the engine.

Other objects of the invention reside in the various details of construction of the cap and the manner of assembling the valve therewith.

In accomplishing these and other objects of the invention, I have provided the improved details of construction, the preferred forms of which are illustrated in the accompanying drawings, wherein—

Figure 1 is a side elevation of a part of an automobile engine showing the breather pipe equipped with a cap constructed and applied in accordance with the present invention.

Figure 2 is an enlarged sectional view of the cap taken in a vertical plane through the axis of the cap.

Figure 3 is a lower end view of the same.

Figure 4 is an upper end view and section taken on the line 4—4 in Figure 2.

Figure 5 is a detail sectional view showing part of the device taken on the section line 5—5 in Figure 4.

Referring more in detail to the drawings— 1 designates what may be an automobile engine of a well-known type having a breather pipe 2 through which oil is poured into the engine crank case and through which the engine breathes when running. Upon the pipe 2 is fitted a cap designated in its entirety at 4. This cap comprises a cylindrical sleeve having a lower end portion 5 adapted to be fitted within the upper end of the pipe 2 and a larger upper end portion 6 formed integral with part 5 and connected thereto by an annular, downwardly facing shoulder or seat 7, a ringlike pad or washer 8 is fitted about the sleeve and against the shoulder 7 and this seats against the upper end of the pipe to provide a tight, non-leaking connection. It is preferred also that the lower part of the sleeve be provided with a plurality of outwardly pressed flanges or ribs 9 for frictional holding engagement with the interior of the pipe to retain the cap securely in place.

Supported over the upper end portion 6 of the sleeve, and in spaced relation therewith, is a cap 10 having a down turned annular flange 11 that extends below the level of the upper end of the sleeve and is spaced therefrom to provide for the exhaustion of air. The cap is supported fixedly from the sleeve by means of four straps 12 that extend from the lower edge of the cap flange and which are welded or otherwise secured to the sleeve as shown in Figures 3 and 4.

Seated upon the upper end of the sleeve end 6 is a valve disc 15 which is held functionally in position by means of a pin 13 that is fixed centrally to the under side of the cap 10. The valve is free to slide upwardly or downwardly on the pin and operates to permit exhaustion of air through the pipe and to prevent the intaking of air. The pin is provided with a stop shoulder 16 against which the valve may move and whereby its upward movement is limited.

Extending centrally across the sleeve below the valve disk 15 and welded at its ends upon the shoulder portion 7 of the sleeve, is a baffle strap 17 which is for the purpose of deflecting and dividing the exhausting air in such manner that it will cause equal lifting on both sides of the valve disc and will thereby prevent the disc from binding on the guide pin.

With the cap so constructed and applied within the end of the breather pipe as illustrated, it is readily apparent that with the engine in operation air may be exhausted from the crank case but none can readily be intaken, and for this reason the oil in the crank case will be held back against being pumped or drawn by suction past the pistons.

The device can be easily applied or removed when it is desired to fill the crank case with oil. It has no harmful effect on the motor but adds greatly to its efficiency. Such devices can be made at a relatively small cost and will last indefinitely.

Having thus described my invention, what I claim is new therein and desire to secure by Letters Patent, is:—

A cap for breather pipes of automobile engines or the like, comprising a supporting sleeve having a lower end portion adapted to be fitted removably within a breather pipe and having an enlarged upper end portion and an intermediate annular shoulder, a washer fitted about the sleeve against the shoulder to provide a non-leaking connection with the pipe, a cap extending over the upper end of the sleeve and spaced therefrom and having supporting straps secured to the sleeve, a pin fixed centrally to the under side of the cap and having a shoulder thereon, a valve disc slidable on the pin from and against the upper end of the sleeve and limited in its upward movement by the pin shoulder, and a baffle plate extending centrally across the sleeve below the disc.

Signed at Seattle, Washington, this 20th day of December, 1922.

ANTONE E. WOLTER.